July 22, 1969        H. K. HOLDEN        3,456,386
SEED-CARRYING DEVICES
Filed April 24, 1967        2 Sheets-Sheet 1
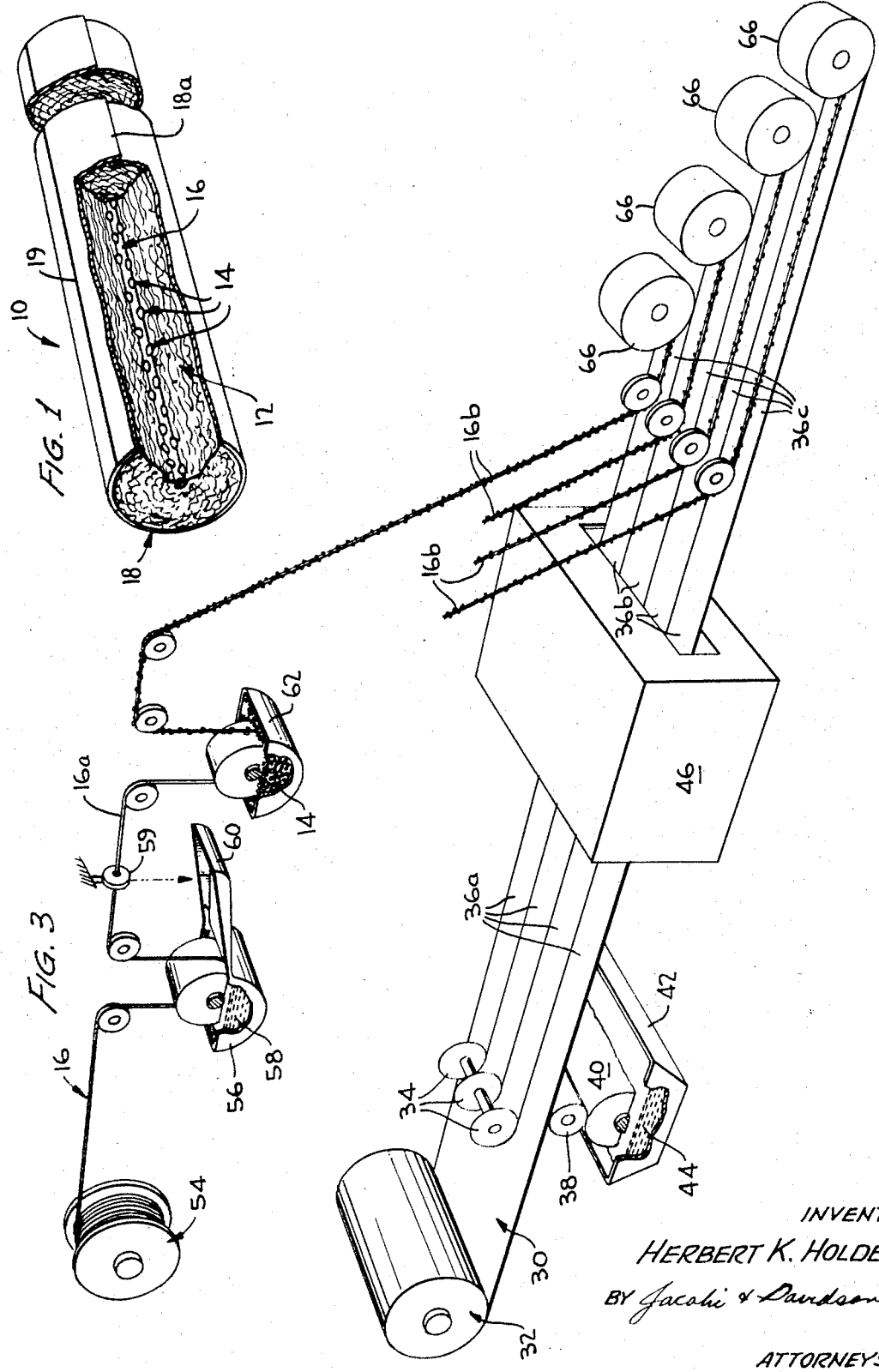
INVENTOR,
HERBERT K. HOLDEN
BY Jacobi & Davidson
ATTORNEYS July 22, 1969  H. K. HOLDEN  3,456,386
SEED-CARRYING DEVICES
Filed April 24, 1967  2 Sheets-Sheet 2
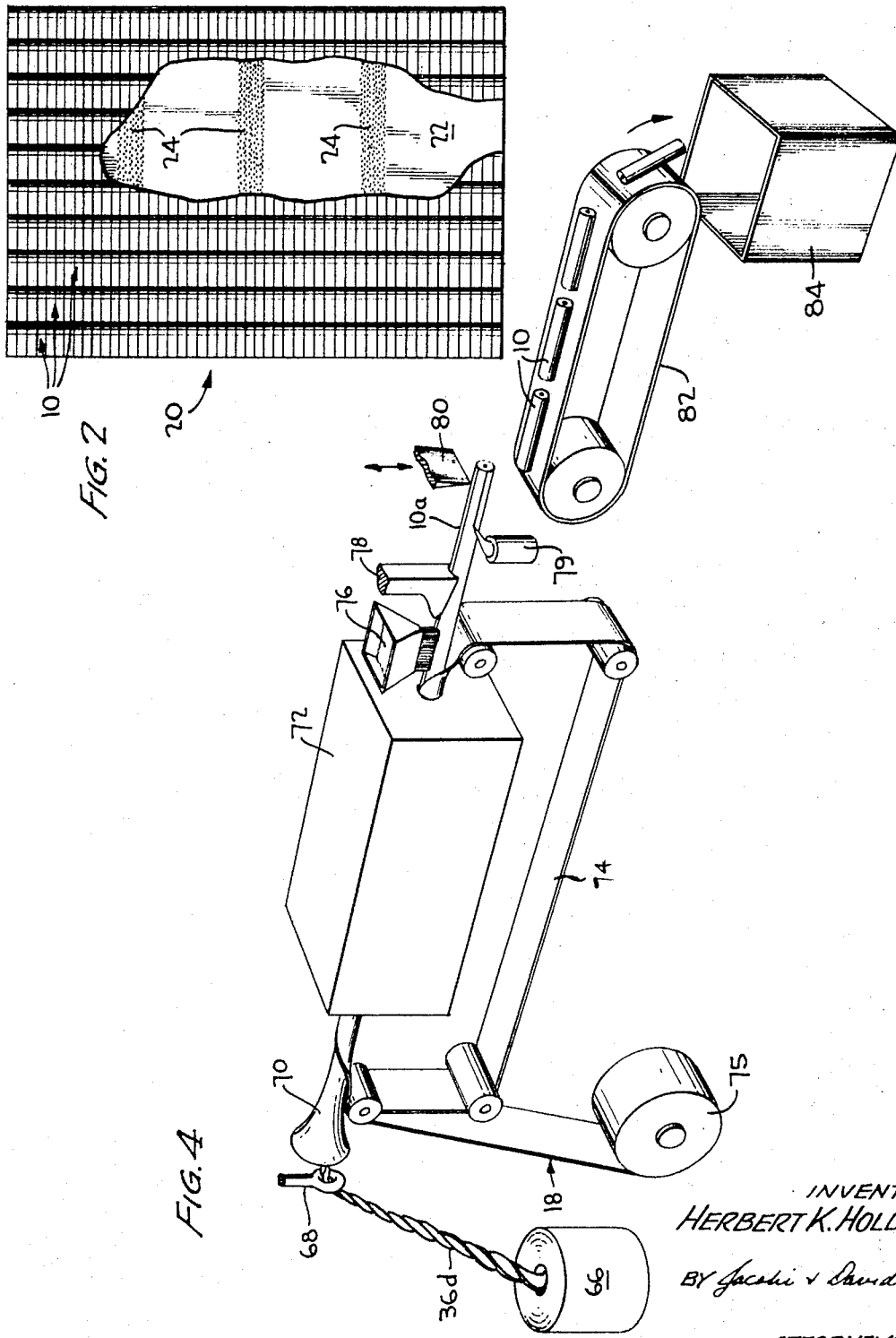
INVENTOR,
HERBERT K. HOLDEN
BY Jacobi + Davidson
ATTORNEYS

United States Patent Office 3,456,386
Patented July 22, 1969

3,456,386
SEED-CARRYING DEVICES
Herbert K. Holden, Bon Air, Va., assignor to American Filtrona Corporation, a corporation of New York
Filed Apr. 24, 1967, Ser. No. 633,050
Int. Cl. A01c *1/04;* B65b *9/10;* B01d *27/00*
U.S. Cl. 47—56                                    2 Claims

ABSTRACT OF THE DISCLOSURE

Seed-carrying devices including a water stable, fibrous mass, gathered into an elongated, rod-like element and encasing a plurality of plant seeds therewithin, with a self-sustaining, readily ruptured, water pervious overwrap retaining the fibrous mass in the rod-like shape. A string to which seeds have been adhesively secured may be utilized for distributing the seeds along the length of the seed-carrying device. The devices are manufactured with modified cigarette filter plug making machinery and a seed-string is incorporated during the manufacture according to preferred techniques. The overwrap may be color-coded to indicate the shade of flower bloom to be expected from the plant seeds within the device and a plurality of the individual seed-carrying devices may be adhesively fixed to a single card for merchandising. Each device may be marked to show preferred planting disposition.

---

This invention relates to a seed-carrying device and techniques for manufacturing the same and relates more particularly to a device in which a plurality of plant seeds of any chosen type are substantially uniformly distributed and carried to facilitate the germination and propagation of the plant seeds for proper growth of the same.

The most common technique for propagating plants is to deposit individual seeds at a desired location in soil or other such medium for growth of the plants. With proper treatment of the soil, the seeds will germinate and eventually grow into the desired plants. It is important that proper moisture content be maintained during the germination and propagation and, commonly, plant nutrients such as fertilizers and the like as well as other additives including fungicides, insecticides, etc., are added to the soil in order to provide a proper environment for the plant growth. Such a procedure is obviously relatively time consuming particularly if it is desired that individual plants be precisely located as in a garden or the like.

Frequently, plant seedlings are grown as in a hot house or the like and these seedlings are then transplanted to the desired location. Seedling propagation also requires careful manipulation of the environment necessitating great care and causing substantial expense, particularly when considered in light of the large number of seedlings which must be grown in this manner.

Numerous suggestions have been made in the prior art for techniques to facilitate these procedures. Various seed-carrying devices have been suggested wherein a plurality of seeds are encased in an elongated element capable of being utilized, at least for the initial germination, to produce the plant seedlings. The seedlings may then be separated and transplanted as desired or the seed-carrying device may be initially planted in the soil at the desired location. However, each of the prior art suggestions have suffered from one or more disadvantages.

Certain of the prior art techniques merely wrap a plurality of seeds in an elongated paper web or the like. Such a construction fails to provide a significant "water reservoir" to maintain the proper moisture balance during the seed germination since the paper web is relatively thin and therefore has a low capacity for water. Additionally, while the paper web is self-sustaining when dry, it ordinarily disintegrates when wet in use, particularly if the device is merely placed in a water bath to provide sufficient moisture for germination of the seeds. In fact, many prior art references emphasize the necessity for such disintegration in order to permit growth of the seedlings through the wrapping material. However, disintegration of the web destroys the carrying device precluding subsequent transplanting and resulting in the seeds being unsupported soon after the device is moistened. Thus, such devices cannot ordinarily be used unless they are planted directly in a soil base or other substantially solid medium whereby the device acts merely as a means to initially locate or position the seeds and not as a permanent carrier for the seeds and the resulting seedlings.

Similar problems exist with other forms of prior art devices of the type with which the instant invention is concerned wherein the seeds are encased, for example, in a gelatinous medium. Such material, while initially providing a water reservoir due to its hygroscopic nature, will readily disintegrate, once again, leaving the individual seeds without any significant support during and after germination.

Alternative approaches to this problem have encased a medium in which plants can be grown such as soil, peat moss or the like in a waterproof, relatively stable, film of plastic or other such material to provide an elongated, rod-like element having the stability which the constructions described previously lacked. Due to the waterproof nature of the plastic overwrapping it is necessary to provide for entrance of water to properly germinate and propagate the seeds. Thus, according to certain embodiments of this general nature, the plastic wrapper is left open at the ends of the rod-like element relying on capillary flow of moisture through the ends to wet the entire structure and provide the necessary "water reservoir." This arrangement, however, permits the soil or other such absorbent medium within the plastic wrapping to escape from the ends of the device thereby eroding the capillary material, causing loss of seeds near the ends and greatly weakening the structure.

This difficulty can only be overcome with seed-carrying devices of this type by entirely encasing individual seeds within the waterproof plastic wrapping material. However, such an arrangement makes it relatively difficult to provide proper quantities of water for plant propagation. Thus, it is necessary with a construction of this nature to perforate the waterproof covering along its length to permit access of water to the soil therewithin. Of course, too many perforations functions to greatly weaken the overall structure and too few such perforations functions to preclude good water balance.

Another significant disadvantage to seed-carrying devices wherein the seeds are either partially or entirely encased in a waterproof plastic film or the like is that the seedlings cannot grow through such a covering material without damage. For this reason, it is ordinarily necessary that individual plant seeds be "injected" into the device by puncturing the film after manufacture of the rod-like element. In this manner, the seedlings can grow through the aperture formed during the "injection." However, in addition to such procedures being time consuming and relatively complex, the plastic film overwrap is not penetrable by the growing roots whereby it must be removed before transplanting.

Another problem inherent with the manufacture of prior art seed-carrying devices of the type with which the instant invention is concerned is the proper distribution of the individual plant seeds therewithin. Of course, when the plant seeds are "injected" into the device they can be properly spaced in a desired manner, but, as pointed out hereinabove, the time-consuming nature of such a process renders it undesirable from a commercial standpoint. Other methods for distribution of the plant seeds require great care and frequently result in nonuniform distribution with sections of the device having too many seeds for satisfactory plant propagation and other sections of the device having too few seeds for desirable commercial use of the same.

Thus, it will be seen that although there is a great commercial need for a seed-carrying device which is useful in propagating and growing various types of plants, prior art attempts to satisfy this need have not been particularly successful. Although the aforementioned difficulties with such prior art devices are not intended to be all-inclusive, it will be recognized that, in general, presently available seed-carrying devices suffer from one or more of the following commercial disadvantages:

(1) They are relatively complex and expensive to manufacture rendering them undesirable for large scale commercial use;

(2) They are either highly unstable whereby they disintegrate in use as with certain single-layer paper or the like wrappings or certain gelatinous coatings used heretofore or the more conventional plant-growing media such as soil or the like or, alternatively, they are rendered somewhat stable by means such as a waterproof plastic film which makes seed distribution and propagation as well as maintaining a proper moisture balance difficult; and (3) They are frequently incapable of collecting and holding sufficient moisture to prevent drying out in a relatively short time which, obviously, would preclude proper plant propagation whereby additional moisture must be provided by watering the same at frequent intervals.

In any event, no means are presently available which satisfy the various commercial requirements. Thus, it is a primary objective of the instant invention to provide a seed-carrying device and techniques for manufacturing the same which overcomes the various disadvantages set forth hereinabove, and others, and which is particularly adapted for large scale commercial production due to relatively low manufacturing costs and product reliability in use.

Consistent with the above, the instant invention provides techniques for manufacturing seed-carrying devices which are similar to certain procedures utilized in the manufacture of cigarette filters and which, as is necessary in the manufacture of cigarette filters, are capable of producing large quantities of the seed-carrying devices for minimal expenditures. Due to the nature of the high speed manufacturing techniques hereof, seed-carrying devices according to this invention may be readily produced in multi-million unit lots with a relatively small increase in the price to the purchaser beyond the actual cost of the plant seeds themselves whereby the instant inventive concepts may be made available for both small quantity users such as the home-gardener and large quantity users such as commercial nurseries.

A further object of the instant invention is the production of seed-carrying devices which include a relatively high bulk, low density encasement for the plant seeds having capillary properties and defining a "water reservoir" capable of collecting and holding significant quantities of moisture for use by the plant seeds. Further, the fibrous mass defining the "water reservoir" according to this invention is stable to the moisture and will not disintegrate during use of the device, but rather, will retain its capillary properties and stability over relatively long periods of use.

Additionally, the fibrous mass in which the plant seeds are carried according to the basic concepts of this invention may also be utilized as a carrier for various growth-promoting additives such as fertilizers, fungicides and the like.

To maintain the desired density of the fibrous mass, the same is overwrapped according to this invention with a self-sustaining web which, while being water-pervious to permit uniform flow of moisture from a surrounding source of the same into the capillary fibrous mass, will not disintegrate under ordinary use thereby precluding the fibrous mass from losing its integrity and rendering the "water reservoir" and the supporting medium for the plant seeds at least substantially permanent in nature.

In contrast, however, to the prior art plastic film overwrap mentioned hereinabove, the covering material utilized in accordance with the instant invention, particularly when moistened, is readily ruptured by the growing plant seedling in order that the seedling may grow directly through the overwrap without damage. In this manner, the plant seeds can be initially distributed within the confines of the fibrous mass before the overall construction of the carrying device is completed and need not be "injected" through the relatively non-rupturable covering utilized in prior art constructions. Thus, the operation of distributing the plant seeds within the seed-carrying device is substantially simplified making the final product capable of production at a reasonable price.

With regard to the distribution of the plant seeds within the device, although, in its broadest aspects, more common distributing techniques such as merely feeding the seeds from a hopper or the like can be utilized, the instant invention provides, in its preferred embodiments, a particularly useful technique for insuring relatively uniform distribution of a desired quantity of plant seeds along the length of each seed-carrying device. Specifically, this invention makes use of what might be termed a "seed string," that is, a string or yarn element which adhesively carries a plurality of plant seeds and which may be readily produced by merely passing the yarn element through an adhesive bath and then through a hopper filled with the plant seeds. The gauge of the yarn element in relation to the size of the particular plant seeds being utilized as well as the viscosity or adhesive qualities of the adhesive material may be varied at will to modify the quantity of plant seeds carried by each unit length of the yarn element. In this manner, not only is relatively uniform distribution of the plant seeds insured, but a predetermined quantity of such seeds within ordinary working tolerances may also be maintained in a simple manner.

Thus, the seed-carrying device of this invention functions to retain each of the individual seeds in a particular location for germination and propagation when the entire device is initially planted in the soil so as to reduce loss of seeds which would result from more conventional cultivating procedures wherein the individual seeds would be subject to environmental conditions such as wind and precipitation as well as protecting the seeds against access by birds or the like. Alternatively, the individual devices may be initially "planted" in a water bath until the seedlings have grown to sufficient size for transplanting.

In addition to simplified manufacturing techniques and improved product characteristics, this invention, with slight modifications, is readily merchandised in a commercially desirable manner. For example, one feature of the instant invention includes color-coding of the individual seed-carrying devices by merely dyeing the paper overwrap to a color which is correlated to the color of the plant to be grown from the plant seeds therein. Thus, a purchaser may readily determine by mere visual inspection, the shade of flowers which may be expected from any individual seed-carrying device according to this invention. For instance, a device carrying yellow zinnia seeds may be color-coded yellow, a device carrying seeds for blue petunias may be color-coded blue, etc. Similarly, vegetable seed-carrying devices may also be color-coded so that a tomato seed-carrying device may be color-coded red, a pepper seed-carrying device may be color-coded green, etc.

Further, a plurality of seed-carrying devices according to the instant inventive concepts may be adhesively carried by an individual card which may, for example, be encased in a well-known plastic "blister" pack for merchandising. Then, on removal of the "blister" pack, the entire card may be set within a water-containing trough or the like for germination and propagation of the seeds within all of the seed-carrying devices supported thereby. Transplanting of the seedlings may subsequently be effected by separating the individual device from the card and cutting the device into smaller segments to be grown in the soil.

Other and further objects of the instant invention will become readily apparent by reference to the following detailed description and the accompanying drawings wherein:

FIGURE 1 is an enlarged perspective view of an individual seed-carrying device according to the preferred construction of this invention, partially broken away for illustrative clarity;

FIGURE 2 is an elevational view of a card supporting a plurality of seed-carrying devices according to this invention and particularly adapted for merchandising and using such devices, parts being broken away for illustrative clarity to show the adhesive backing on the card to which the individual seed-carrying devices are secured;

FIGURE 3 is a schematic showing of the initial processing steps in a preferred procedure for manufacturing seed-carrying devices according to the instant inventive concepts; and FIGURE 4 is a schematic showing of the final processing steps according to the preferred manufacturing procedure.

Like reference characters refer to like parts throughout the several views of the drawings.

Referring now to the drawings in general and more particularly to FIGURE 1, a seed-carrying device according to the preferred construction of the instant invention is designated generally by the reference numeral 10 and comprises basically a water-stable fibrous mass 12 gathered into an elongated, rod-like element in a manner to be described in more detail hereinafter, a plurality of plant seeds 14 at least substantially uniformly distributed along the length of the device 10, and in the embodiment of FIGURE 1, adhesively secured to a string or yarn element 16 substantially centrally located within the confines of the fibrous mass 12, and a self-sustaining, readily ruptured, water-pervious overwrap 18 secured over the fibrous mass 12 and retaining the same in the rod-like shape.

Of course, the individual seed-carrying devices 10 may be formed in any desired shape, the generally cylindrical shape shown merely being illustrative and preferred. Additionally, the particular size of an individual seed-carrying device is, of course, not critical, although it is anticipated that commercial devices will be approximately 8.1 mm. in diameter and approximately 114 mm. long.

A particularly important feature of the instant invention is the nature of the fibrous mass 12 which confines the individual plant seeds. The fibrous mass 12 has capillary properties and provides means defining a water reservoir capable of collecting and holding moisture for use by the plant seeds 14 during germination and subsequent propagation of the same. Additionally, as will be explained in greater detail hereinafter, the fibrous mass 12 can act as a carrier for various growth-promoting additives such as plant nutrients, e.g., fertilizer or the like, as well as fungicides, insecticides, etc.

Various details as to the type of fibrous material and the method of its pretreatment in manufacturing seed-carrying devices according to the instant invention will be set forth hereinafter, although, in general, it is significant to note that the fibrous mass 12 may be considered to be of relatively high bulk and low density as compared, for example, with an ordinary paper web such as has been utilized according to certain prior art constructions for wrapping or carrying the seeds. For example, although the density is not absolutely critical as such, it is desired that the fibrous mass having a density on the order of approximately 0.1 g./cc., and possibly even less. Thus, the fibrous mass within 10 rods of the preferred dimensions set forth hereinabove weighs approximately 6 g. This value may be raised or lowered somewhat within the skill of the art so long as the density is not increased to a point at which its water-collecting and holding properties are not undesirably diminished or decreased to a point wherein the structural stability of the same is destroyed or greatly weakened. Thus, stability must be balanced against water capacity and cost of materials. Those skilled in the art can readily determine how far they can depart from the preferred density set forth previously without detrimentally affecting the product. In any event, since the fibrous mass which encases the seeds can be considered to be of relatively high bulk and low density when compared to the means in which the seeds are confined in prior art constructions, the device of the instant invention provide more effective "water reservoirs" for the seeds retaining relatively large quantities of moisture for longer periods of time than seed-carrying devices previously available whereby they will not dry out too quickly, requiring less attention for proper plant growth.

The fibrous mass 12 is preferably formed from a gathered, non-woven web of an unbleached lignocellulosic or wood fibrous material such as cellulose wadding or a semi-creped sulfite pulp. Although a bleached material may be utilized, it is advantageous both from the standpoint of expense and from the standpoint of appearance, to utilize an unbleached material which is ordinary light tan in color. In view of the fact that the growth-promoting additives may have a tendency to slightly stain, the tan nature of the fibrous mass precludes a mottled appearance and provides a more uniform coloring to the seed encasement.

Another characteristic of the materials from which the fibrous mass is formed according to this invention is their "water-stability," that is, although the fibrous mass has a high capacity for moisture, it is not deleteriously affected thereby. Thus, the seed encasement will not deteriorate in use of the devices.

The nature of the overwrap 18 is also quite significant in regard to the instant inventive concepts. It is necessary that this overwrap be "self-sustaining" whereby it can initially function to retain the fibrous mass within its confines and can continue to so-function even when wet in use of the devices. Further, in order that the plant seeds may be distributed within the fibrous mass during, rather than after, the manufacture of the devices with the seedlings being capable of growing directly through the overwrap, it is necessary that the same be "readily ruptured." Thus, while the overwrap must maintain its structural integrity when wet, it must offer substantially no resistance to penetration by either the stem or the roots of the growing plant seedling so as to preclude damage thereto. Further, to satisfy the requirements of this invention it is desirable that the overwrap be "water-permeable," that is, capable of passing water from a surrounding source to the fibrous mass for quick and uniform formation of the "water reservoir." Ordinary unglazed paper overwrap utilized to confine the filtering material in the manufacture of cigarette filter plugs has been found to be particularly satisfactory for use as the overwrap 18 in the manufacture of seed-carrying devices according to this invention although other suitable materials may be substituted therefor.

The overwrap 18 includes a waterproof lapped seam 18a as will be explained in more detail hereinafter. Since this portion of the overwrap is of double thickness and since the adhesive securing the same is waterproof, some resistance to penetration may result along the length of the same. For this reason a waterproof ink line 19 is preferably provided approximately 90 degrees out of phase with respect to the seam 18a whereby the user can be directed to place the line 19 either substantially vertically upward or substantially vertically downward during propagation so that neither the stem nor the roots of the seedling will encounter this barrier during growth.

The use of the terms "water-permeable" and "readily ruptured" in describing the overwrap 18 herein and in the appended claims will be understood to extend to the substantially uniform properties which result with a device such as shown in FIGURE 1 wherein the seam 18a comprises only a minor or unsignificant portion of the overwrap 18.

As mentioned previously, the overwrap with the seed-carrying devices of this invention may include a color-coding means to facilitate selection and use by prospective purchasers and to improve the appearance of such devices from a merchandising standpoint. Basically, this feature can be readily provided by merely utilizing a paper overwrap which has been dyed to a color which is correlated to the shade of flower or color of vegetable to be produced by the particular plant seeds carried by each individual device. Such a color-coding has been illustrated by the horizontal cross-hatching of the devices 10 in FIG-URE 2 which, in this instance, designates a blue-dyed overwrap corresponding to the blue flowers to be produced from the seed-carrying devices shown therein. Of course, devices carrying different seeds and therefore differently color-coded may be included in a single unit such as the preferred merchandising unit designated generally by the reference numeral 20 in FIGURE 2. The unit 20 comprises a cardboard card or the like 22 having a plurality of stripes of an adhesive material illustratively shown at 24 of any suitable type, preferably a pressure-sensitive adhesive, to which is secured a plurality of seed-carrying devices 10. The entire card may be adhesively coated if desired. The unit 20 may be encased for sale within a conventional "blister" pack (not shown) or any other protective covering which can be stripped therefrom prior to use, the reverse of the card 22 (not shown) including the name and a picture of the plant to be grown from the seeds carried thereby and planting instructions therefor. With the unit 20 shown in FIGURE 2, the individual seed-carrying device 10 may be readily removed from the card 22 for use, if desired. Alternatively, the entire unit 20 including the card 22 and the seed-carrying devices 10 supported thereby may be merely placed in a "water bath," that is, a plate or a small trough with a slight excess of water beyond that which is quickly collected by the fibrous mass 12 in each of the individual seed-carrying devices 10. After germination, individual seed-carrying devices 10 may be removed from the card, cut into segments with scissors or the like and planted in soil or individual seedlings may be transplanted by removing the same from the fibrous mass 12. However, one advantage of the fibrous mass 12 of this invention is that the roots of the plant become entangled therewith whereby separation therefrom is not necessary, or even desirable,, the fibrous mass acting as a water reservoir for the seedlings even after transplanting. In any event, it will be seen that a unit such as shown at 20 in FIGURE 2, in addition to being quite attractive from a merchandising standpoint, is exceptionally versatile in use.

Referring now to FIGURES 3 and 4, a preferred procedure for manufacturing seed-carrying devices such as the device 10 shown in FIGURE 1 is schematically illustrated. The fibrous mass 12 is preferably formed from a non-woven sheet of a cellulosic fibrous material 30, a roll of which is shown at 32. The sheet 30 is preferably slit longitudinally by any conventional cutter means, illustrated schematically at 34, to form a plurality of webs 36 of lesser width than the original sheet 30. Of course, the arrangement shown is merely preferred for manufacturing simplicity although, in accordance with broader concepts of this invention, the original source of non-woven fibrous material may be of the desired width for an individual processing line. However, with the arrangement shown in FIGURE 3 a plurality of webs may be readily processed simultaneously.

As mentioned previously various different materials may be utilized for the sheet 30 or the webs 36, and such materials may require different processing procedures in order to provide a fibrous mass of the desired properties. Regardless of the material of the webs 36 it is generally desirable to include in the fibrous mass 12 various growth-promoting additives such as fungicides, fertilizers and the like. To effect this addition, the webs 36 may be passed into contact with a kiss roller such as shown at 38 which engages a roller 40 rotatably supported in a trough 42 carrying an aqueous or other bath of a solution or dispersion of any desirable additive materials. Obviously, various additives well known to those skilled in the art may be dissolved or dispersed in the bath 44. An exemplary fungicide is Du Pont "Arasan 75" and any conventional balanced N–P–K fertilizer may be utilized. Other desired additives may include chemical means for buffering the pH of the fibrous web, dyes if it is desired to color the fibrous mass 12 (which generally is not necessary in view of the color-coding of the overwrap mentioned hereinabove) and the like. The concentration of the additives may be varied to provide the desired growth environment for the plant seeds although a solution of approximately ½ percent by weight of each of the above additives has been found quite satisfactory for most purposes.

In those instances in which significant wetting of the fibrous web is undesirable during manufacture, the additives may be readily applied by spraying the same in a fine mist onto the web during the processing cycle, a plurality of individual spray stations for the various additives being provided to avoid saturation of the web, if necessary.

In any event, the wet webs 36a may be passed through a drier 46 which may be of any conventional form such as an ordinary infrared drier capable of quickly evaporating and removing excess moisture to substantially fully dry the webs as shown at 36b, basically reducing the moisture content of the same to equilibrium conditions with respect to the atmosphere.

As the dried webs 36b come from the drier 46 a plurality of plant seeds 14 are uniformly distributed along the length thereof, preferably approximately centrally of the width of each web. In accordance with the broadest concepts of this invention (not shown), such distribution may be effected by merely applying a stripe of an adhesive material such as starch or the like to the dried webs 36b and feeding plant seeds from a hopper or the like onto the adhesive strip as the webs pass thereby. However, in accordance with preferred techniques of this invention, a plurality of "seed-strings" are produced (the production of only one such seed-string being shown in FIGURE 3 for illustrative convenience). The individual seed-strings begin with a yarn element 16 carried on a roll 54 or the like which is passed through a bath 56 of adhesive material 58 such as a starch solution including about 30 grams of starch powder $(C_6H_{10}O_5)_x$ mixed in 30 ml. cold water and then dissolved in 350 ml. boiling water. Then, the yarn element is passed through an eye member 59 to control the amount of the adhesive carried on the yarn element 16a. Excess adhesive material is return to the bath 56 by any conventional means such as the drip pan 60.

The adhesive-carrying string 16a is then drawn through a trough or the like 62 containing a multiplicity of a desired type of plant seeds 14 at which point the yarn element picks up a quantity of such plant seeds, the quantity depending upon the gauge of the yarn element in relation to the size of the seeds and the adhesive qualities or viscosity of the adhesive 58. Various gauge yarn elements can be utilized. For example, for chive, petunia, portulaca seeds which are relatively fine, a No. 20, boilfast, six cord mercerized cotton thread has been found quite satisfactory. On the other hand, with coarse plant seeds such as marigold, pepper, tomato and zinnia seeds, a 0.050 inch cotton string is preferred.

The seed-string 16b is permitted to substantially dry and is fed onto the dried webs 36b, being positioned substantially centrally of the width of each web as shown in FIGURE 3. Each web 36c carrying a seed-string which is adhesively secured thereto due to the qualities of the adhesive material remaining on the seed-string is then preferably convolutely wound into individual rolls 66 with the seed-strings 16b inside of each convolution to preclude loss of seeds in handling the rolls 66.

It is to be understood that in FIGURE 3 as in FIGURE 1, the seed-string is shown as carrying relatively large plant seeds 14 individually spaced from each other along the length of the yarn element 16. However, the gauge of the yarn element 16 may be such as to carry a plurality of plant seeds 14 in very close association and the arrangement shown is merely illustrative. The fact that some plant seeds will be on different sides of the yarn element is not significant since, in any event, once the seeds germinate, the roots will always grow downwardly and the stems will always grow upwardly.

The individual rolls 66 are then preferably turned on their side as shown in FIGURE 4 and the web carrying the seed-string is withdrawn from the center of the rolls 66, passed through a guide member 68 into a condensing funnel 70 which leads to the throat of a garniture of a conventional cigarette filter plug making machine shown schematically at 72 wherein the web is gathered into the fibrous mass 12. Ordinarily the roll 66 will not rotate when disposed on its side as shown in FIGURE 4, but in any event, the roll may be retained against rotation so that the web will be twisted upon itself as shown at 36d as it is withdrawn from the center of the roll 66 and fed through the guide element 68. This will provide an initial confinement of the plant seeds 14 to preclude loss of the same during the subsequent processing steps. While the arrangement shown in FIGURE 4 is preferred, the roll 66 may be rotatably supported and the web withdrawn from the exterior thereof without twisting and fed into the condensing funnel 70 with the seed-string on the top of the web as it passes into the funnel to again preclude loss of the seeds. The twisting arrangement of FIGURE 4, however, provides a preliminary gathering of the web and further protects against seed loss.

The paper overwrap 18 is simultaneously fed from a roll 75 of the same to the plug-making machine 72 in a manner similar to the overwrap for a cigarette filter plug. Thus, the overwrap 18 is wrapped around the fibrous web 36d in the plug-making machine 72 in the ordinary manner of making cigarette filter plugs. A continuous belt 74 functions to confine the web 36d and gather the same into the elongated rod-like shape while simultaneously wrapping the paper overwrap 18 thereabout.

Since the devices of the instant invention must not disintegrate when wet, a water proof adhesive material is applied to one edge of the paper overwrap 18 from any conventional means schematically shown at 76 as the same exits from the plug-making machine 72 in order that the continuous, waterproof, longitudinal seam 18a described previously may be formed. A presser foot schematically shown at 78 which may be supplemented by a heater bar (not shown) if necessary for the particular waterproof adhesive being utilized, may be provided to improve the nature of the longitudinal seam 18a. Additionally, any conventional striping means schematically shown at 79 may be utilized to provide the continuous stripe 19 of a waterproof ink, 90 degrees offset from the same 18a. Further, any conventional cutting means shown schematically at 80 as reciprocably supported may be utilized to sever the continuous rod-like element 10a emanating from the plug-making machine 72 to form individual segments each defining a seed-carrying device 10 in accordance with this invention. A conveyor belt 82 may be provided for carrying the devices 10 to a collection area schematically illustrated by the box 84.

Thus, it will now be seen, considering the above, that there is herein provided improved seed-carrying devices and techniques for manufacturing the same which satisfy all of the objectives of the instant invention, and others, including many advantages of great practical utility and commercial importance.

Since many embodiments may be made of the instant inventive concepts, and since many modifications may be made of the embodiments hereinbefore shown and described, it is to be understood that all matter herein is to be interpreted merely as illustrative and not in a limiting sense. Accordingly, what is claimed is:

1. A seed-carrying device comprising
 (a) a water-stable fibrous mass gathered into an elongated, rod-like element, said fibrous mass having capillary properties and providing means defining a water reservoir capable of collecting and holding moisture;
 (b) a plurality of plant seeds at least substantially uniformly distributed along the length of said rod-like element within the confines of said fibrous mass;
 (c) a self-sustaining, readily ruptured, water-pervious overwrap secured over said fibrous mass and retaining the same in the form of said rod-like element, and
 (d) a continuous, longitudinal, waterproof seam securing said overwrap over said fibrous mass and indicia means carried by said overwrap 90 degrees offset about the circumference of said device with respect to said seam.

2. A seed-carrying device comprising
 (a) a fibrous mass formed of a gathered, non-woven web of a lignocellulosic fibrous material in the form of an elongated, rod-like element, said fibrous mass having capillary properties and providing means defining a water reservoir capable of collecting and holding moisture;
 (b) a yarn element extending within the confines of said fibrous mass at least substantially over the full length of said rod-like element;
 (c) a plurality of plant seed adhesively attached to said yarn element and at least substantially uniformly distributed along the length thereof;
 (d) a self-sustaining, readily ruptured, water-pervious overwrap secured over said fibrous mass and retaining the same in the form of said rod-like element, and
 (e) a continuous, longitudinal, waterproof seam securing said overwrap over said fibrous mass and indicia means carried by said overwrap 90 degrees offset about the circumference of said device with respect to said seam.

References Cited

UNITED STATES PATENTS

| 2,196,917 | 4/1940 | Hartley | 53—178 |
| 2,338,103 | 1/1944 | Fischer | 47—56 |
| 3,172,234 | 3/1965 | Eavis | 47—1.2 |
| 3,310,448 | 3/1967 | Tupper | 156—349 |
| 3,362,106 | 1/1968 | Goldring | 47—56 |

ROBERT E. BAGWILL, Primary Examiner

U.S. Cl. X.R.

53—178; 131—261; 156—349